Sept. 5, 1961 P. JACKSON 2,998,808
OPPOSED PISTON DIESEL ENGINES
Filed April 22, 1959
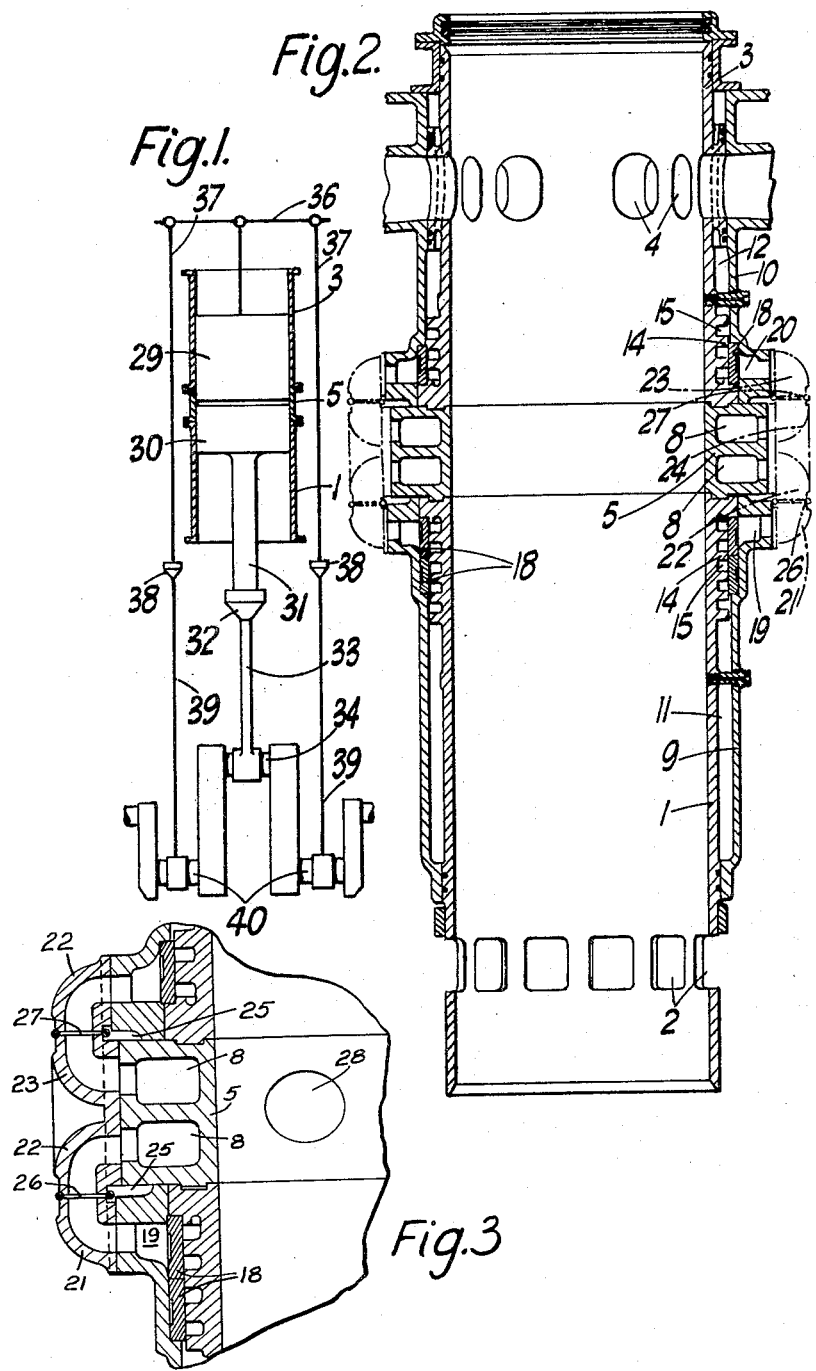

United States Patent Office 2,998,808
Patented Sept. 5, 1961

2,998,808
OPPOSED PISTON DIESEL ENGINES
Percy Jackson, Sunderland, England, assignor to William Doxford & Sons (Engineers) Limited, Sunderland, England, a British company
Filed Apr. 22, 1959, Ser. No. 808,121
6 Claims. (Cl. 123—41.72)

The invention relates to opposed piston two-stroke cycle diesel engines having water-cooled cylinders and is especially, but not exclusively, concerned with engines of the type in which the two pistons are connected to separate throws or eccentrics of a common crankshaft or eccentric shaft. It is an object of the invention to improve the cylinder construction of such engine.

The invention provides an opposed piston two-stroke cycle diesel engine having a water-cooled cylinder constructed in at least two parts each with its own cooling water jacket forming therewith an independent water-tight unit.

The invention also provides an opposed piston two-stroke cycle diesel engine having a water-cooled cylinder with a separately constructed liner in two parts providing respectively the whole or major portions of the working surfaces for the two pistons and, between the two parts of the liner with gas-tight joints thereto, a combustion belt with a cooling water jacket, cooling water jackets around the two parts of the liner and one or more connections for water flow between the combustion belt jacket and at least one of the liner jackets which connection or each connection is jointed at a position external to and spaced from the joints between the liners and the combustion belt whereby entry into the working cylinders through the joints therein of water which may leak from the connection joint is avoided.

It is a preferred feature of the invention that a least one of the liners is formed over at least a part of the length adjacent the combustion belt with external circumferentially extending ribs providing channels between them for cooling water and the liner is strengthened against internal pressures by a ring or rings shrunk onto the ribs.

The combustion belt may be provided with holes for one or more fuel injectors, air starting and relief valves and the two liner parts may have air inlet and exhaust ports respectively.

As an example of the invention, a specific construction of an engine will now be described with reference to the accompanying drawings in which:

FIGURE 1 is a diagram showing one of the cylinders and associated parts of the engine, FIGURE 2 shows a section through one of the engine cylinders, and FIGURE 3 shows a detail of part of FIGURE 2.

The engine is a multi-cylinder Doxford marine engine, each cylinder being of the construction which is shown in the drawings and will now be described.

The cylinder comprises a lower liner part 1 with inlet ports 2 for scavenge and combustion air, the ports being covered and uncovered by the lower piston, an upper liner part 3 with exhaust ports 4 which are covered and uncovered by the upper piston and a combustion belt 5 between the two liner parts. The liner parts are bolted to the belt in gas-tight relation. The belt is formed with a jacket providing interconnecting passageways 8 for cooling water. Around each liner part there is a jacket 9, 10 which leaves spaces 11 and 12 for cooling water.

Each liner part is formed, adjacent the combustion belt, with circumferential ribs 14 providing between them grooves 15 for cooling water, the ribs being cut away at intervals to permit flow of water from one groove to the next. Rings 18 are shrunk onto the ribs thereby to provide additional strength to the liner parts in the region of the combustion zone. Ports are formed in the rings for the water, and lead into and out of annular chambers 19, 20 around the jackets. A hole 28 for a fuel injector is provided in the combustion belt as shown in FIGURE 3.

The chamber 19 has attached thereto at intervals around the cylinder, elbows 21 which mate with elbows 22 on the belt 5. Similarly the chamber 20 has elbows 23 which mate with elbows 24 on the belt 5. The joints 26, 27 between the mating elbows are in the open leaving open annular air spaces 25 between the joints 26, 27 and the joints between the liner parts and the belt.

In the operation of the engine cool water flows into space 11, through the grooves 15, chamber 19 and elbows 21 and 22 into the passageways 8. The water then flows through elbows 24 and 23 into the chamber 20 and thence through the upper grooves 15 into space 12 from which it is discharged.

Within the cylinder there are two pistons 29, 30 of which the lower piston, 30, is connected by a piston rod, 31, cross-head 32 and connecting rod 33 to one throw, 34, of a crankshaft. The upper piston, 29, is attached to a beam 36 which in turn is connected by rods 37, cross-heads 38, and connecting rods 39, to two further throws 40 of the crankshaft.

In addition to the advantage already mentioned that leakage of water into the cylinder is avoided, the construction described has the further advantages that the liner being in two parts facilitates manufacture and replacement and the independent jackets and combustion belt are also easier to construct and replace than a complete cylinder. That is the cylinder and cooling jacket are constructed as three units each of which is readily interchangeable. The arrangement of the ribs and shrunk-on rings enables the thickness of the liners to be reduced.

I claim:

1. A water-cooled cylinder structure for an opposed piston two-stroke cycle diesel engine in which the cylinder is constructed in at least two parts with at least one gas-tight joint therebetween, each part having its own cooling water jacket forming therewith an independent water-tight unit with inlet and outlet openings which are external of the joint aforesaid, and at least one connection between an outlet opening in one jacket and an inlet opening in the other for water flow between the jackets which connection is jointed at a position external to and spaced from the gas-tight joint aforesaid to leave an open air space between the two joints.

2. A water-cooled cylinder structure for an opposed piston two-stroke cycle diesel engine, in which the cylinder comprises two cylinder parts providing respectively the major portions of the working surfaces for the opposed pistons, and between the two parts with gas tight joints thereto, a combustion belt, each part and the combustion belt having a cooling water jacket forming therewith an independent water-tight unit with inlet and outlet openings, at least one connection for water flow between the combustion belt jacket and one of the cylinder part jackets which connection is jointed at a position external to the gas-tight joint between the cylinder part and the combustion belt, and the water jackets having cooperating structure forming an open annular air space between the gas-tight joint and the joint for the connection for water flow.

3. A water-cooled cylinder structure as claimed in claim 2 wherein there are connections for water flow between both cylinder part jackets and the combustion belt jacket.

4. A water-cooled cylinder structure as claimed in claim 2 wherein at least one of the cylinder parts is formed over at least a part of the length adjacent the combustion belt with external circumferentially extending ribs providing channels between them for cooling water and the cylinder part is strengthened against internal pressure by a ring shrunk onto the ribs.

5. A water-cooled cylinder structure as claimed in claim 2 in which the combustion belt is provided with at least one hole for a fuel injector.

6. A water-cooled cylinder structure as claimed in claim 2 in which the two cylinder parts have air inlet and exhaust ports respectively.

References Cited in the file of this patent

UNITED STATES PATENTS 2,703,077　　Antousen _____ Mar. 1, 1955